United States Patent
Nilsson et al.

(10) Patent No.: US 7,149,258 B2
(45) Date of Patent: Dec. 12, 2006

(54) METHOD AND APPARATUS FOR ESTIMATION OF PHASE OFFSET BETWEEN COMMUNICATION CHANNELS

(75) Inventors: Johan Nilsson, Malmö (SE); Håkan Eriksson, Tyresö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 903 days.

(21) Appl. No.: 09/997,344

(22) Filed: Nov. 28, 2001

(65) Prior Publication Data

US 2003/0099216 A1   May 29, 2003

(51) Int. Cl.
H04L 27/06 (2006.01)
H04B 1/69 (2006.01)

(52) U.S. Cl. .................... 375/316; 375/148
(58) Field of Classification Search ................. 375/147, 375/316, 130, 148, 144; 370/335, 342, 441
See application file for complete search history.

(56) References Cited

U.S. PATENT DOCUMENTS

| | | | |
|---|---|---|---|
| 5,191,598 A | 3/1993 | Bäckström et al. | |
| 5,583,886 A | 12/1996 | Rohani et al. | |
| 5,822,380 A | 10/1998 | Bottomley | |
| 6,069,884 A | 5/2000 | Hayashi et al. | |
| 6,611,675 B1 * | 8/2003 | Salonen et al. | 455/69 |
| 6,754,473 B1 * | 6/2004 | Choi et al. | 455/101 |
| 6,839,326 B1 * | 1/2005 | Pajukoski et al. | 370/252 |

FOREIGN PATENT DOCUMENTS

| | | |
|---|---|---|
| EP | 0 881 782 A2 | 12/1998 |
| EP | 0 955 741 A1 | 11/1999 |
| EP | 0 964 529 A | 12/1999 |
| EP | 0 993 129 A2 | 4/2000 |
| EP | 1 133 072 A | 9/2001 |
| JP | 58077348 | 5/1983 |
| JP | 58087928 | 5/1983 |
| JP | 1218134 | 8/1989 |
| JP | 4150113 | 5/1992 |
| JP | 5300059 | 11/1993 |
| JP | 09163053 | 1/1999 |
| WO | 95 12927 A1 | 5/1995 |
| WO | 99 59263 A1 | 11/1999 |

OTHER PUBLICATIONS

U.S. Appl. No. 09/996,513, filed Nov. 28, 2001, Nilsson et al.
U.S. Appl. No. 09/573,157, filed May 19, 2000, Nilsson.
Proakis, John G., "Digital Signaling over a Bandwidth-Constrained Linear Filter Channel, 6.7.2 An Adaptive Channel Estimator", Digital Communication, Second Edition, 1989, pp. 624-627.
3rd Generation Partnership Project (3GPP); Technical Specification Group Radio Access Network; Physical channels and mapping of transport channels onto physical channels (FDD), 3 G TS 25.211 version 3.3.0, Release 1999, pp. 2-42.
3rd Generation Partnership Project (3GPP); Technical Specification Group Radio Access Network; Physical layer procedures (FDD), 3 G TS 25.214 version 3.3.0, Release 1999, pp. 2-44.

* cited by examiner

Primary Examiner—Tesfaldet Bocure
(74) Attorney, Agent, or Firm—Potomac Patent Group PLLC

(57) ABSTRACT

Methods and apparatus are described for estimating a phase offset between two channels in a communication system to allow the use of both in determining a complex channel estimate. The phase offset arises from the system's rotation of only one of the two signaling channels prior to its transmission on one of the two antennas in transmission diversity mode. The phase offset is calculated in a receiver, such as a mobile station. For example, in a 3GPP system, the DPCH, which is rotated, and the CPICH, which is not, may be used in channel estimation.

21 Claims, 6 Drawing Sheets

METHOD AND APPARATUS FOR ESTIMATION OF PHASE OFFSET BETWEEN COMMUNICATION CHANNELS

BACKGROUND

This invention relates to channel estimation in a receiver and more particularly to channel estimation based on signals in at least two channels, one of which may be a pilot signal channel, and even more particularly to estimation of a phase offset between the channels.

In a digital communication system, digital symbols representing information are transmitted between different nodes (e.g., base stations, mobile phones) to exchange information.

A layered model often referred to as the OSI (Open System Interconnection) model is often used to describe communication systems. The lowest layer in that model, where information streams consisting of bits are transmitted, is often referred to as the physical channel. A physical channel provides services with a pre-defined quality, depending on the arrangement. In a simplified description, a physical channel includes the formatting of bits in a pre-defined format, coding, interleaving, modulation of a carrier, transmission over a medium, down-conversion, demodulation, de-interleaving, and forward error correction. In addition, there are many other functions that are required for proper operation, such as synchronization in both time and frequency and channel estimation. Pilot symbols are often transmitted among information symbols on the physical channels. These pilot symbols are then used in the receiver to obtain synchronization and channel estimates. The channel estimates describe how the transmitted symbols are affected by the channel (including the modulation, TX front-end, medium, RX front-end, and demodulator) and are used to reconstruct the signal in the receiver.

Physical channels can be of two types, dedicated physical channels and broadcast channels. Dedicated physical channels are transmitted to one receiver while broadcast physical channels are intended for multiple receivers.

The medium carries the electromagnetic or optical signal between the antennas of the different nodes. In radio communication systems the medium consists of "free-space" (which is not free) and the signal is electromagnetic waves propagating in this medium. Reflections due to buildings and other obstacles, result in fading and dispersion. Dispersion may cause multi-path depending on the symbol rate on the physical channel and the severity of the dispersion.

A base station most often transmits multiple physical channels. In TDMA systems, physical channels from the same base station are separated using time (and frequency if multiple carriers are used). In FDMA systems only frequency is used to separate different physical channels. In spread spectrum CDMA systems, codes are used to separate different users (and frequency if multiple carriers are used).

In the WCDMA system, based on the 3GPP specification, the common pilot channel (CPICH) and the pilots transmitted in the dedicated physical channel (DPCH) that are transmitted from the same base station may be transmitted using the same front-end and the same antenna at the base station. Then, these two channels experience the same medium response and thus channel estimates based on the CPICH and DPCH are both useful for providing a good estimate of channel coefficients. This is not the case when the CPICH and the DPCH are transmitted using two different antennas.

Regardless of the channel used, a received signal differs from the transmitted signal in various ways due to the effects of passing through the transmission medium. In a medium, such effects on a radio-frequency signal primarily include multipath fading, interference from other signals passing through the medium, and thermal noise. Fading is caused by the interaction of the signal with reflections or echoes of itself, and may result in large and highly localized amplitude and phase shifts of the signal, known as Rayleigh fading. In a radio environment, interference is often caused by the unwanted presence of other radio signals. These other signals may be using the same channel as the desired signal (sometimes called co-channel interference) or using an adjacent channel (sometimes called adjacent channel interference). Thermal noise is present in all communication channels, and causes additional distortion of the transmitted signal. The signal received at the receiver can therefore be thought of as a composite signal consisting of a desired component and an impairment component. The impairment component represents the effects of passage through the medium, e.g., interference and noise.

At the receiver, a received signal is processed to obtain a sequence or stream of digital samples, called here "received samples" or a "received sample stream", and these samples may be represented as complex numbers. For example, the received signal may be filtered, amplified, and mixed down to baseband using in-phase and quadrature local oscillators, and after analog-to-digital (A/D) conversion and synchronization processing, a stream of complex received samples r(n) is obtained. Each sample in the complex sample stream r(n) may be represented as a sum of a real component and an imaginary component, that is, $r(n)=I(n)+jQ(n)$, where $I(n)$ represents the in-phase components of the samples, $Q(n)$ represents the quadrature components of the samples, and n is a sample time index.

Each complex received sample can also be represented as a sum of the desired component and the impairment component, that is, $r(n)=s(n)+z(n)$, where $s(n)$ is a stream of desired signal components and $z(n)$ is a stream of impairment components, or noise. As noted above, the impairment component samples $z(n)$ may include interference from other signals, such as co-channel and adjacent channel interference and self-interference due to multipath propagation, and thermal or environmental noise. Often there are several interfering signals, with one being the strongest in power relative to the rest.

The receiver typically applies some form of baseband signal processing to the received sample stream r(n) to recover (or "detect") the information symbols. Such baseband signal processing may be based on a model of the transmission medium. For example, the transmission medium may be modeled as a filter having K complex channel tap coefficients; the input to the filter is the transmitted digital signal and the output from the filter is the desired signal component. If b(n) represents the transmitted digital signal, then the desired signal component samples s(n) are given by:

$$s(n)=h(0)b(n)+h(1)b(n-1)+\ldots+h(K-1)b(n-K+1)$$

where h(k) are the channel tap coefficients that are complex values having both real parts and imaginary parts. The channel tap coefficients may be expressed in polar representation by:

$$h(k)=a(k)e^{j\Theta(k)}$$

where the amplitude of h(k) is a(k), which is the absolute value of h(k). The phase of h(k) is expressed as θ(k).

Estimates of the channel tap coefficients can be determined by various channel tap estimation techniques. Channel tap estimation, or channel tracking, is well known in the art and is discussed, for example, in J. Proakis, *Digital Communications*, 2d ed., pp. 624–627 McGraw-Hill Book Co. (1989). Initial channel tap estimates can be obtained from synchronization-signal correlation values or least-squares estimation using known techniques.

Channel tap coefficient estimates $h_{est}(k)$ are used to calculate a detected digital symbol sequence $b_{det}(n)$. For example, if only $h_{est}(0)$ is non-zero (viz., if the medium is modeled by a filter having only one tap) and b(n) is binary, then $b_{det}(n)$ is given by:

$$b_{det}(n) = sgn[h_{est}(0)*r(n)]$$

where sgn[x] denotes taking the sign of x and superscript "*" denotes the complex conjugate. In this example, b(n) is binary so the allowable values of $b_{det}(n)$ are binary, e.g., +1 and −1. Thus, it can be seen that accurate detection of the transmitted digital signal b(n) is dependent on having accurate estimates of the channel tap coefficients.

This may be better understood by referring to FIG. 1, which illustrates a typical digital communication system that includes a transmitter 12 and a receiver 14. Transmitter 12 includes a digital symbol generator 102 and a digital transmitter 103. Symbol generator 102 receives an information carrying signal 101 and generates a corresponding digital symbol sequence b(n). The digital symbol sequence b(n) is passed to digital transmitter 103, which subjects the sequence to digital-to-analog (D/A) conversion, modulation, pulse shaping, and amplification, and transmits the resulting analog signal Y. Receiver 14 comprises one or more receiver radio units 18a–18n, each of which may have a corresponding antenna 16a–16n, radio processor 105a–105n, and A/D converter 106a–106n. Each antenna 16a–16n receives an analog received signal corresponding to the transmitted signal Y and passes the received signal to a radio processor 105a–105n. Antennas 16a–16n may be spaced apart from one another, and accordingly, each radio unit 18a–18n receives a received signal from a different receive channel (space diversity).

In the example of FIG. 1, the channels are radio transmission channels, but those skilled in the art will appreciate that the channels may be telephone transmission channels, local area network transmission channels, etc. The channels may also be radio channels associated with phased array antenna elements or beams from a beam former.

Radio processors 105a–105n typically filter, amplify, and down-convert the received signal to base band. The baseband received signal is then converted by A/D converters 106a–106n into streams of complex digital received samples $r_x(n)_1$ where the subscript x indicates the receive channel corresponding to the sample stream. For example, radio unit 18a may receive an analog signal from antenna 16a and generate a corresponding digital received sample stream $r_a(n)$. The resulting digital signals $r_x(n)$ are sequences of complex samples having in-phase (I) and quadrature (Q) components. It will be understood by those skilled in the art, however, that the samples need not be complex. The complex samples $r_x(n)$ are provided to a baseband processor 20, which manipulates the complex samples using the estimated channel tap coefficients $h_{est}(k)$ to detect the information symbols, producing $b_{det}(n)$ from the received sample streams $r_x(n)$.

Multipath propagation is generally disadvantageous, since the self-interference signals are time dispersed and therefore able to interfere with one another and create fading. Multipath propagation can, however, also be of benefit. The reflected signals transmit the same information as the main signal. When fading has caused pronounced attenuation of the main signal itself, the main signal can be "reconstructed" or amplified by constructive addition of the time-dispersed rays, i.e., the signal becomes diversity amplified.

The baseband processor 20 includes a rake receiver. A rake receiver is a radio receiver which utilizes this feature of time dispersed signals beneficially. The rake receiver includes a plurality of independent receiver units, so-called rake branches, each of which receives and tracks, or locates, a respective ray. The rake receiver also includes means for combining the received signals, and means for delaying these signals so that they will be brought into phase prior to combining the signals.

If more than one channel tap coefficient is non-zero, then some form of equalization may be performed using channel tap coefficient estimates. One form of equalization is Maximum Likelihood Sequence Estimation (MLSE) equalization, which is described in chapter 6 of the book by J. Proakis that is cited above. Accordingly, the baseband processor 20 may include a coherent detector that may be implemented by a multi-antenna MLSE equalizer such as that disclosed in U.S. Pat. No. 5,191,598 to Backstrom et al., which is hereby expressly incorporated in this application by reference. It will be understood that the detected symbols may be further processed by the receiver. For example, forward error correction decoding may be performed on the detected symbols. The symbols may also be combined into soft information values.

Due to the effects of the transmission through the channel(s), the signals arriving at the antennas 16 include impairment signals, which include thermal noise and possibly interference signals as described above. An example of an interference signal is shown in FIG. 1 as signal X generated by interferer 106. The impairment signals make it difficult for the receiver to recover perfectly the information symbols from the received sample streams.

If the impairment component includes interference, then various interference rejection techniques can be applied to improve the signal to noise ratio (SNR) of the received signal and thereby improve the accuracy of the channel tap coefficient estimates. Interference rejection using array processing techniques can produce large performance gains in a digital transmission system, but for this kind of interference rejection to perform well, reasonable estimates of the channel tap coefficients of each separate channel are required. Examples of interference rejection techniques include those described in J. H. Winters, "Signal Acquisition and Tracking with Adaptive Arrays in the Digital Mobile Radio System IS-54 with Flat Fading", *IEEE Trans. Veh. Technol.*, vol. 42, pp. 377–384 (November 1993). Such techniques allow for good detection performance in the presence of large interference.

In a traditional communication system, each physical channel is tracked separately, which is to say that the channel tap coefficients of each physical channel are estimated independently, using each physical channel's received sample stream without reference to the received sample streams of other physical channels. Many known methods of estimating channel tap coefficients consider the channel tap coefficients as functions only of the signal received over the physical channel under consideration. Due to interference, accurately estimating each separate physical channel's channel tap coefficients may be difficult, leading to potential errors since the detector uses the estimated channel tap coefficients to detect the transmitted signal.

Each Base Station in a WCDMA system transmits on several physical channels. For several reasons, many of these physical channels contain pilot symbols that can be used to estimate channel properties. A pilot signal is typically one or more predetermined symbols that may be transmitted on its own channel or embedded in another channel and may be used for supervisory, control, equalization, continuity, synchronization, or reference purposes.

As noted above, transmit diversity may be achieved with independent transmissions from two antennas, which may be associated with, for example, two base stations (BS), in order to lessen the sensitivity of the communication to disruption should signal fading occur on one or both of the propagation paths due to channel noise or other changes to the propagation path characteristics. Different pilot signals, or pilot symbols, may be transmitted by the two antennas, and this enables a remote receiver in user equipment (UE), such as a mobile station, to derive individual channel estimates for signals transmitted by the two BS antennas.

Referring again to FIG. 1, data generated in the transmitter 12 may contain, for example, channel encoded data, transmit power control (TPC) commands, optional transport format combination indicators (TFCIs) and the like. One such communication system is the third generation cellular telephone system that is being standardized by the Third Generation Partnership Project (3GPP). For downlink (base station to remote station) transmissions in 3GPP communication systems, the data may be space-time block encoded and may be rate matched, interleaved, and the like. One or more pilot signals may be multiplexed with the encoded data, and the multiplexed streams may be combined with channelization codes, scrambling codes, and the like. The channelized, scrambled signals are then transmitted by one or more antennas to the receiver 14.

FIG. 2 depicts an exemplary format of information carried by a transmission channel in the communication system of FIG. 1. As in many digital systems, the information carried by a channel is organized in a plurality of slots 210 that are grouped into a succession of frames 220, each of which includes a plurality of the slots 210. As shown in FIG. 2, the frames 220 may also be grouped into a succession of superframes 230. Each slot 210 may contain, among other information, a TFCI 211, a first group of data (payload) 212, a TPC command 213, a second group of data 214, and a pilot signal 215. In one exemplary communication system, slots may have durations of 0.625 millisecond (ms) and include variable numbers of bits, depending on the types of slots, frames may include sixteen slots, and superframes may include seventy-two frames. Every base station also transmits a CPICH that comprises pilot symbols with a spreading factor of 256. This CPICH is transmitted with relatively high power to reach the border of the cell.

Various approaches to channel estimation have been described. For example, U.S. Pat. No. 5,822,380 to G. Bottomley for "Apparatus and Method for Joint Channel Estimation" describes, among other things, an apparatus for estimating channel tap coefficients as functions of a received sample stream from a channel whose channel tap coefficients are being estimated and as functions of at least one other received sample stream from another channel. This patent is hereby expressly incorporated in this application by reference. U.S. patent application Ser. No. 09/573,157 filed on May 19, 2000, by J. Nilsson for "Method and Apparatus for Channel Estimation with Transmit Diversity" describes channel estimation using pilot signals in a transmit diversity environment. This patent application is hereby expressly incorporated in this application by reference.

European published patent application No. EP 0 955 741 to S. Abeta et al. for "Channel Estimating Apparatus, and CDMA Receiver and CDMA Transceiver Each Having the Apparatus" describes obtaining channel estimates of data symbols based on a pilot symbol sequence that is parallel to the data symbol sequence. U.S. Pat. No. 5,583,886 to K. Rohani et al. for "Method for Determining a Plurality of Channel Responses and Modifying a Received Signal Therewith" describes a frequency-hopping spread spectrum communication system that determines a plurality of channel estimates based on known signals transmitted from each of a plurality of transmitters.

Channel estimation methods using transmit diversity encoded pilots have relied on grouping, for example, alternate pilot symbols from the diversity pilots to generate two sets of channel estimates. Such methods usually assume that the characteristics of the channels over which the pilot symbols are transmitted are constant for a duration of three or more symbols. Such an assumption leads to inaccuracies when the channel characteristics vary rapidly with time (typical of a spread spectrum system experiencing large Doppler shift and using a high spreading factor). It will be appreciated that the spreading factor in a direct-sequence code division multiple access (DS-CDMA) communication system refers to the length of a symbol in chips, e.g., the number of transmitted bits or symbols in a spreading sequence per information bit or symbol. A high spreading factor thus results in an information symbol having a long duration.

The use of multiple received signals for estimating channel tap coefficients is further complicated when the characteristics of the multiple received signals are too different. In a 3GPP system, the DPCH and CPICH, both of which can be simultaneously received by a remote terminal, e.g., by different fingers of a rake receiver, have useful properties for facilitating channel estimation. The CPICH may be transmitted at a higher power level than other physical channels, such as the DPCH, to facilitate detection and transmission power control schemes for interference control, among other reasons. Such a "gain offset" between the DPCH and CPICH can be compensated for accurate information symbol detection to be achieved in accordance with the techniques described in Applicants' co-pending U.S. patent application Ser. No. 09/996,513, filed on Nov. 28, 2001, for "Methods and Apparatus for Channel Estimation Using Plural Channels", which is hereby expressly incorporated in this application by reference.

In addition to such a gain offset, errors occur when the received signals are derived from physical channels having a varying relative phase difference, which is common in many modern communication systems, including 3GPP systems. In particular, phase offsets arise and should be corrected when the received signals have been transmitted by multiple antennas, such as two antennas of a base station operating in a transmit diversity mode. Such an operational mode in a 3GPP communication system is the closed loop mode transmit diversity described in "Physical Layer Procedures (FDD)", 3G TS 25.214 ver. 3.3.0, section 7 (June 2000) that is described below in connection with FIG. 3, which shows a transmitter 300 for transmitting a CPICH and a DPCH.

In FIG. 3, the processes of channel coding and interleaving of the DPCH signal may be performed as in nondiversity mode and are depicted by the DPCH generator 302. The DPCH signal produced by the generator 302, which is generally complex-valued, is spread and optionally scrambled by a combiner 304 that combines the generator's output signal and a spreading signal such as a Walsh-Hadamard sequence and a pseudo-random noise scrambling sequence. The spread/scrambled signal is fed to two transmit (Tx) antenna branches that include respective multipliers 306-1, 306-2 that also receive respective weight factors $w_1$ and $w_2$. The weight factors are also generally complex-valued and, as provided by the 3GPP standard, correspond to phase adjustments in a closed loop mode 1 and phase/amplitude adjustments in a closed loop mode 2. These adjustments are determined by the receiver (UE) and are signaled to the transmitter (BS) 300 by messages in an uplink channel, in particular bits of a feedback information (FBI) field of an uplink channel such as a dedicated physical control channel (DPCCH). The weight factors are recovered by blocks 308, 310 from received signals (Rx) provided by one or both antennas 312-1, 312-2. Also indicated in FIG. 3 are combiners 314-1, 314-2 that combine the DPCH and CPICH for transmission by the antennas 312. For the closed loop mode 1, different (orthogonal) pilot symbols are sent from the two different antennas. For closed loop mode 2, the same dedicated pilot symbols are sent from both antennas. The use of the two modes is controlled by higher-layer messaging.

As provided in 3GPP, 3G TS 25.214 V3.1.1, Dec. 1999, the receiver uses the CPICH separately to estimate the channels seen from each antenna. Once every slot, the receiver computes a phase adjustment, $\phi$, (and for mode 2 an amplitude adjustment) that should be applied by the transmitter to maximize the power received by the receiver. One way to compute the phase adjustment is to determine the weight vector $\underline{w}$ that maximizes the following expression:

$$P = \underline{w}^H H^H H \underline{w} \qquad (1)$$

where, given $|\underline{w}|=1$, $$H = [\underline{h}_1, \underline{h}_2]$$

and $$\underline{w} = [w_1, w_2]^T$$

and where the column vectors $\underline{h}_1$ and $\underline{h}_2$ represent the estimated channel impulse responses for the antennas 312-1, 312-2 and are of length equal to the length of the channel impulse responses.

The elements of $\underline{w}$ correspond to the adjustments computed by the receiver (UE) that are typically quantized and fed back to the transmitter (BS) on an uplink channel. The weight vector $\underline{w}_1$ may be set to a constant such as $\underline{w}_1=1$ and then the weight vector $\underline{w}_2$ may be calculated by sliding window averaging the received phases over two consecutive slots. Algorithmically, $w_2$ can be calculated as follows:

$$w_2 = \frac{\sum_{i=n-1}^{n} \cos(\phi_i)}{\sqrt{2}} + j \frac{\sum_{i=n-1}^{n} \sin(\phi_i)}{\sqrt{2}}$$

as shown in 3GPP, 3G TS 25.214 V3.1.1.

Therefore, in closed loop mode 1, the receiver (UE) must signal the feedback information to the transmitter (BS) so the transmitter can calculate which value of the phase offset $\phi$ will provide phase alignment between the antennas. The actual value of $\phi$ used by the transmitter is generally unknown to the receiver. However, only the DPCH is rotated with $(w_1, w_2)$. The CPICH remains unaffected by the feedback information.

Using the CPICH in channel estimation is generally advantageous, since it is transmitted at a higher power level and therefore incurs less interference from noise. In order to effectively use the CPICH in channel estimation, the receiver must determine the value of $\phi$.

Accordingly, there is a need to calculate phase offset estimates for multiple received channels in a receiver and to combine channel estimates from multiple received channels having varying phase offsets in an optimal way.

SUMMARY

These and other needs are satisfied by Applicants' invention, which provides a method for determining the phase offset value $\phi$ to allow the use of a channel that is offset by $\phi$, such as the CPICH, to be effectively used in channel estimation.

In one aspect, a method of determining a phase offset between signaling channels in a communication system includes deriving a first set of channel estimates from symbols received through a first channel and a second set of channel estimates from symbols received through a second channel. The phase offset is determined at the receiver based on the first and second sets of channel estimates.

In another aspect of Applicants' invention, a method of determining a set of complex channel estimates for a transmission channel in a communication system includes deriving a first and second set of channel estimates from symbols received through a first and second signaling channel, respectively. A phase offset between the first and second signaling channel is determined based on the first and second sets of channel estimates. A set of complex channel estimates are determined based on the phase offset.

In yet another aspect of Applicants' invention, a channel estimator adapted to operate with a receiver in a communication system to determine a set of complex channel estimates for a transmission channel of the communication system includes means that derive a first set of channel estimates from symbols received through a first signaling channel. The channel estimator also includes means that derive a second set of channel estimates from symbols received through a second signaling channel, means that determine a phase offset between signaling channels in the communication system based on the first and second sets of channel estimates, and means that determine the set of complex channel estimates based on the phase offset and a first set of channel estimates.

In still another aspect of Applicants' invention, user equipment for a communication system is adapted to determine a set of complex channel estimates for a transmission channel of the communication system as described above.

The receiver may be part of, for example, user equipment, e.g., a mobile phone or other portable radio device within a communication system. The transmitter may be a base station within that communication system.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The objects, features, and advantages of this invention will be understood by reading this description in conjunction with the drawings, in which.

DETAILED DESCRIPTION

Some modern digital communication systems such as those described in the patents and publications cited above use rake receivers to handle reflections, or echoes, of a transmitted signal that travel different paths and arrive at the receiving antenna at different times. A rake receiver may be thought of as having a plurality of "fingers", and each finger may be thought of as a separate receiver for a respective signal path. To improve performance, the outputs of the rake fingers are often combined through a process of maximum ratio combining, and more accurate channel estimates improve the accuracy of such maximum ratio rake combining and the accuracy of the eventual detected symbols.

Typically, channel estimates are derived from pilot symbols included in the transmitted signal, but data symbols and other known symbols may also be used. In the 3GPP standard, two channels have pilot symbols that are suitable for channel estimation when receiving dedicated channels, the DPCH and the CPICH, as described in "Physical Channels and Mapping of Transport Channels onto Physical Channels (FDD)", 3G TS 25.211 ver. 3.3.0 (June 2000).

Figure 1:
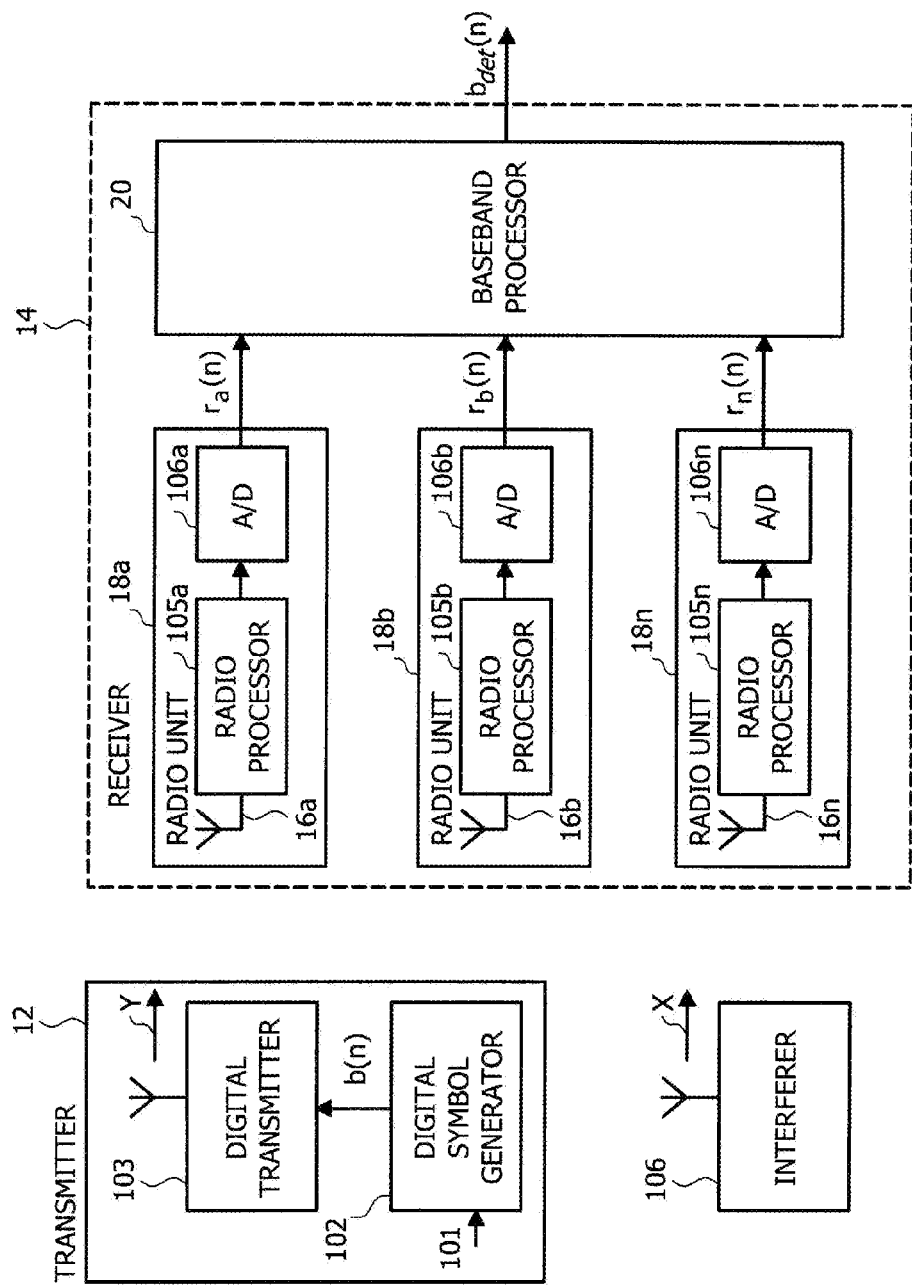
FIG. 1 is a block diagram of a typical digital communication system.
Figure 2:
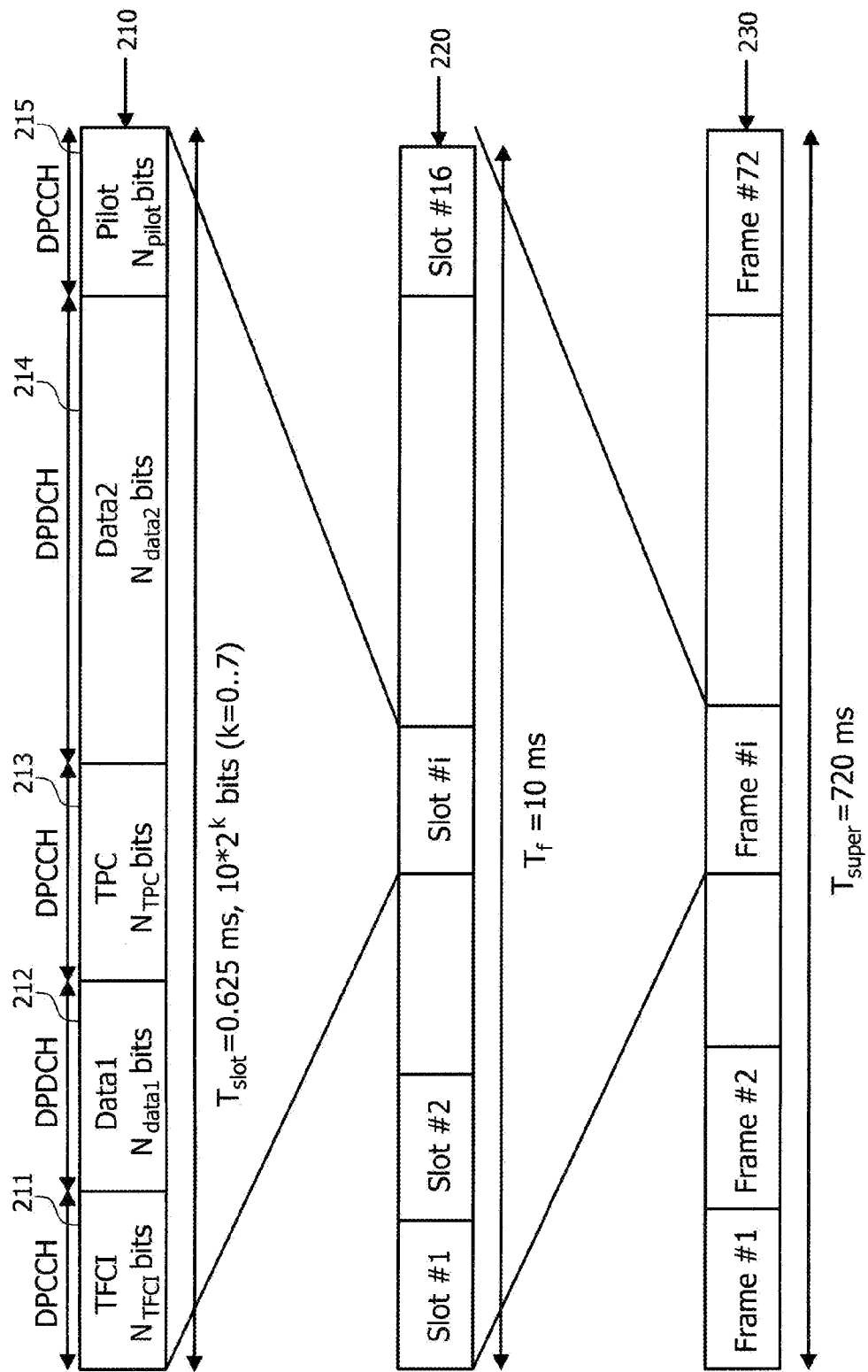
FIG. 2 depicts a slot format of a down-link physical channel in a WCDMA system.
Figure 3:
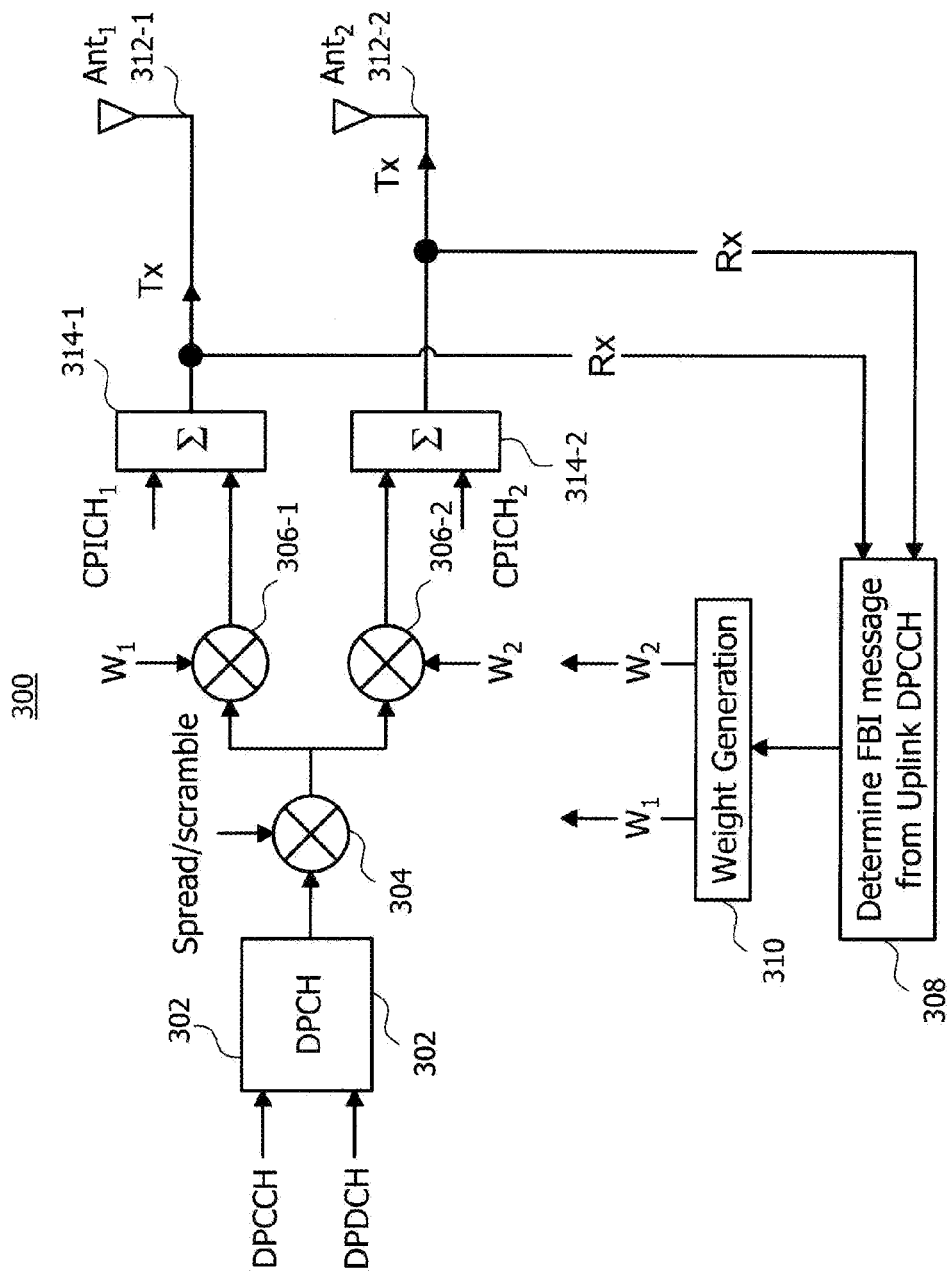
FIG. 3 is a block diagram of a transmitter.

Referring again to FIG. 3, only the DPCH is rotated with ($W_1$, $w_2$). The CPICH is not affected by the FBI sent from a UE to the BS. The UE must know the phase offset $\phi$ to use the CPICH in channel estimation for maximum ratio combining. Since only the signal transmitted via antenna $Ant_2$ 312-2 is rotated, the channel estimates from $Ant_2$ 312-2 may be used to obtain the phase offset $\phi$. Accordingly, this application describes an optimal way of combining information from several fingers to obtain a phase estimate. The following is a mathematical derivation of Applicants' method of estimating the phase offset between two channels. Once the phase offset is estimated, the CPICH may be advantageously used in channel estimation.

Let the second antenna channels for CPICH and DPCH, represented by the subscripts $2c$ and $2d$, be given by the following expressions:

$$h_{2c}^i = a_i e^{j\alpha_i} \quad (3)$$

$$h_{2d}^i = b_i e^{j\beta_i} \quad (4)$$

respectively, where $i \in [1, n]$ is the rake finger number, a and b are the respective channel gains, and $\alpha$ and $\beta$ are the respective antenna phases.

Let the second antenna phase estimates for finger $i \in [1, n]$ be given by the following expressions (steps 402, 404):

$$\hat{\alpha}_i = \alpha_i + e_i \quad (5)$$

$$\hat{\beta}_i = \beta_i + v_i \quad (6)$$

for the CPICH and the DPCH, respectively, where $e_i$ and $v_i$ represent noise. Further, let the noise be uncorrelated, zero mean, complex Gaussian-distributed noise with the variances $\sigma_{ei}^2$ and $\sigma_{vi}^2$, respectively.

As DPCH is multiplied by a phase offset $\phi = \{\pi/4, 3\pi/4, 5\pi/4, 7\pi/4\}$ relative to the CPICH, the phase relation between the channels becomes:

$$\beta_i = \alpha_i + \phi \quad (7)$$

The maximum likelihood solution is the set $\theta = \{\alpha_1, \ldots, \alpha_n, \phi\}$, fulfilling:

$$\overset{max}{\theta} \, p(Y|\theta) \quad (8)$$

where the observation set is $Y = \{\hat{\alpha}_1, \ldots, \hat{\alpha}_n, \hat{\beta}_1, \ldots \hat{\beta}_n\}$.

The conditional probability function $p(Y|\theta)$ is given by the following expression:

$$p(Y|\theta) = \left(\frac{1}{2\pi^n \prod_{i=1}^{n} \sigma_{ei}\sigma_{vi}}\right) \prod_{i=1}^{n} e^{-\frac{(\hat{\alpha}_i - \alpha_i)^2}{2\sigma_{ei}^2}} \prod_{i=1}^{n} e^{-\frac{(\hat{\beta}_i - \alpha_i - \varphi)^2}{2\sigma_{vi}^2}} \quad (9)$$

and the corresponding log-probability function $\log p(Y|\theta)$ is given by:

$$\log p(Y|\theta) = \quad (10)$$

$$\log\left(\frac{1}{(2\pi)^n \prod_{i=1}^{n} \sigma_{ei}\sigma_{vi}}\right) - \sum_{i=1}^{n} \frac{(\hat{\alpha}_i - \alpha_i)^2}{2\sigma_{ei}^2} - \sum_{i=1}^{n} \frac{(\hat{\beta}_i - \alpha_i - \varphi)^2}{2\sigma_{vi}^2}$$

To maximize the conditional probability function, it is useful to set that function's derivative equal to zero. Doing so for the partial derivative of the log-probability function with respect to antenna phase estimate $\alpha_i$ yields the following expression:

$$\frac{\partial \log p(Y|\theta)}{\partial \alpha_i} = \frac{\hat{\alpha}_i - \alpha_i}{\sigma_{ei}^2} + \frac{\hat{\beta}_i - \alpha_i - \varphi}{\sigma_{vi}^2} = 0 \quad (11)$$

Setting the derivatives in Equations (10) and (11) equal to zero yields the following expression for $\alpha_i$:

$$\alpha_i = \frac{\sigma_{vi}^2 \hat{\alpha}_i + \sigma_{ei}^2(\hat{\beta}_i - \varphi)}{\sigma_{vi}^2 + \sigma_{ei}^2} \quad (12)$$

where the $\phi = \{\pi/4, 3\pi/4, 5\pi/4, 7\pi/4\}$. To find the maximum likelihood phase offset $\phi$, the solution of equation (12) is tested for $\phi = \{\pi/4, 3\pi/4, 5\pi/4, 7\pi/4\}$ in equation (9). Accordingly, using equation (12) in equation (9) yields:

$$p(Y|\theta) = \left(\frac{1}{(2\pi)^n \prod_{i=1}^{n} \sigma_{ei}\sigma_{vi}}\right) \prod_{i=1}^{n} e^{-\frac{(\hat{\alpha}_i - \hat{\beta}_i + \varphi)^2}{2(\sigma_{vi}^2 + \sigma_{ei}^2)}} \quad (13)$$

Solving for the phase offset φ that minimizes equation (13) results in finding the optimal value of the phase offset φ that solves the optimization problem:

$$\varphi \in \left\{ \min_{\pi/4,\, 3\pi/4,\, 5\pi/4,\, 7\pi/4} \right\} \sum_{i=1}^{n} \frac{(\hat{\alpha}_i - \hat{\beta}_i + \varphi)^2}{\sigma_{vi}^2 + \sigma_{ei}^2} \qquad (14)$$

Applicants have recognized that the general expression can be simplified and that equation (13) for the general case can be readily solved for the case of a rake receiver having many fingers or its equivalent.

One assumption that eases solution of equation (13) is to assume that the noise (interference) seen on both CPICH and DPCCH is substantially the same, which is to say that:

$$\sigma_{vi}^2 = \gamma \sigma_{ei}^2 \qquad (15)$$

where γ is a scale factor. In a communication system that uses spread spectrum techniques, the observed noise power $\sigma^2$ is related to the amount of spreading (processing gain) employed on the different channels, and in a 3GPP communication system the amount of spreading can be different on different channels as described in "Spreading and Modulation (FDD)", 3G TS 25.213 ver. 3.0.0 (October 1999). Thus, the scale factor $\gamma=(sf/256)(n_d/n_c)$, where sf is the spreading factor used for the symbols of the DPCH, 256 is the spreading factor used for the symbols of CPICH, and $n_d$ and $n_c$ are, respectively, the numbers of symbols coherently summed to get the DPCH channel estimates $\hat{h}_{2d}^i$ and the CPICH channel estimates $\hat{h}_{2c}^i$. The noise variance $\sigma_{ei}^2$ is a parameter that is easily measured by the receiver, in particular a receiver in a 3GPP communication that is required periodically to report that parameter or parameters related to it and the spreading factor is also known by the receiver through messages sent on the different channels.

It will be understood that the likelihood function of equation (13) assumes that the two channels are independent, which is a valid assumption for many communication systems, in particular for a 3GPP system in which different (orthogonal) spreading sequences are used for the DPCH and CPICH. With this assumption, equation (14) can be rewritten as follows:

$$\varphi \in \left\{ \min_{\pi/4,\, 3\pi/4,\, 5\pi/4,\, 7\pi/4} \right\} \sum_{i=1}^{n} \frac{(\hat{\alpha}_i - \hat{\beta}_i + \varphi)^2}{\sigma_{ei}^2} \qquad (16)$$

As can be appreciated from equation (16), the numerator will decrease when φ is chosen to be close to β and the denominator will decrease as the interference on finger i decreases. Therefore, the channel estimates are intuitively reliable. Further, the minimization will be more influenced by fingers having less noise.

Thus, the phase offset between the two channels, which is generally unknown to the receiver, can be estimated (step 406) by the receiver from derived channel estimates. Once the phase offset is estimated, a complex channel estimate may be determined (step 408).

It is also possible to go further and produce complete channel estimates by associating channel estimate gains with the channel estimate phases determined from equation 16.

Figure 4:
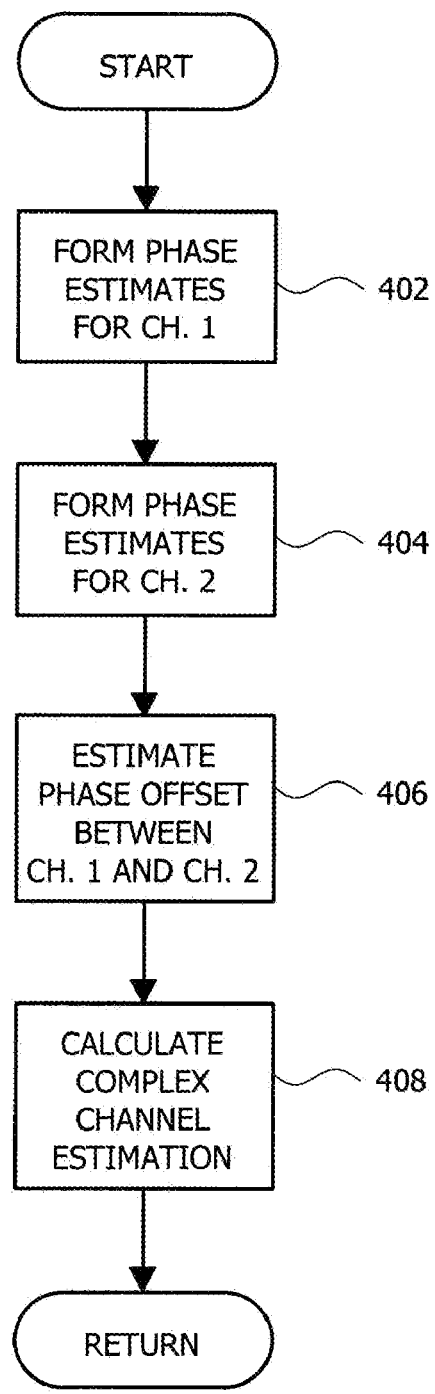
FIG. 4 is a flowchart of methods in accordance with Applicants' invention.

It will be appreciated that the steps of the methods illustrated in FIG. 4 can be readily implemented either by software that is executed by a suitable processor in a receiver, or a baseband processor, or by hardware, such as an application-specific integrated circuit (ASIC), provided in the receiver or baseband processor. The receiver or baseband processor may be used within, for example, a mobile phone or other portable radio device within a communication system.

Figure 5:
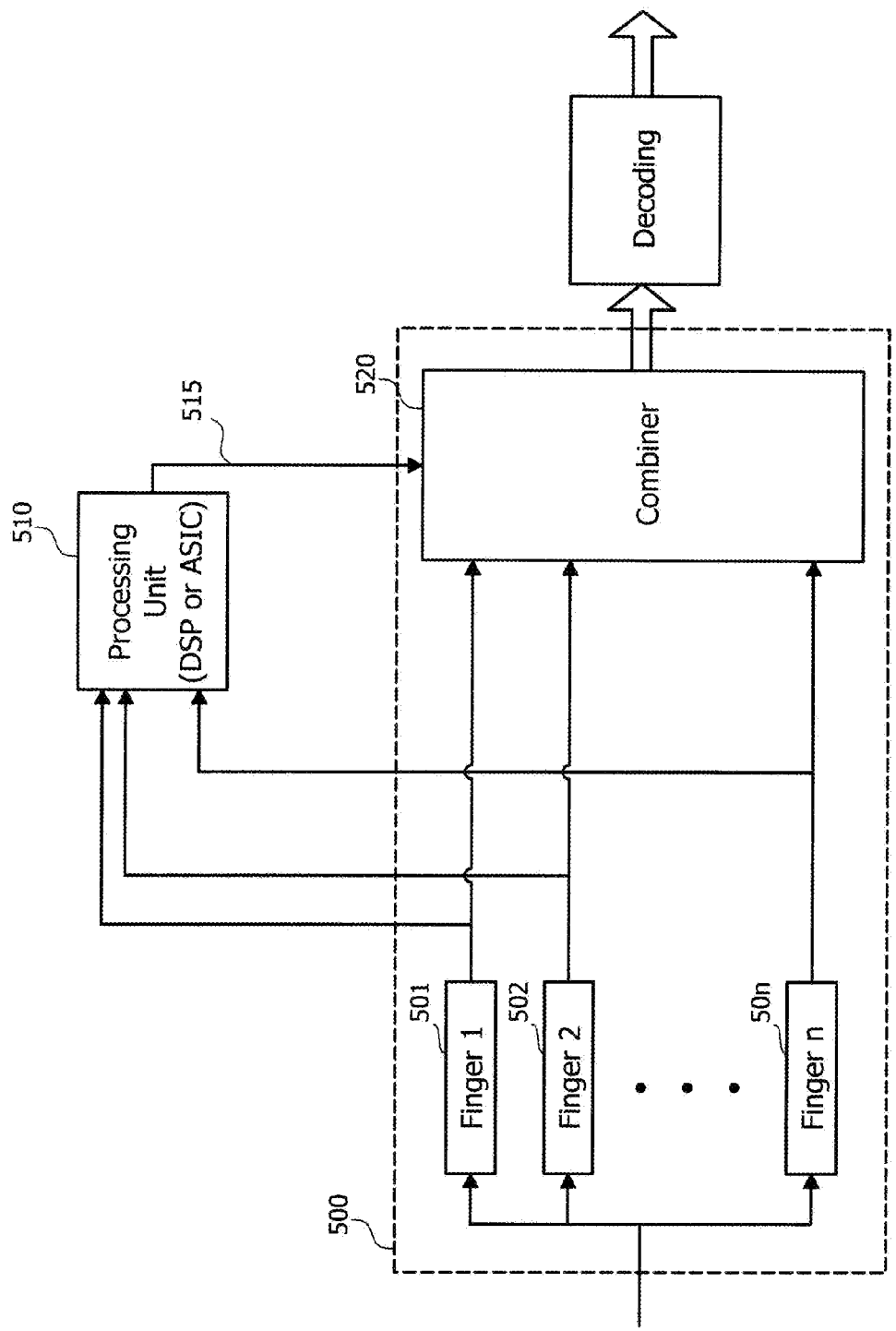
FIG. 5 is a block diagram of a rake receiver and processing unit according to the invention.
Figure 6:
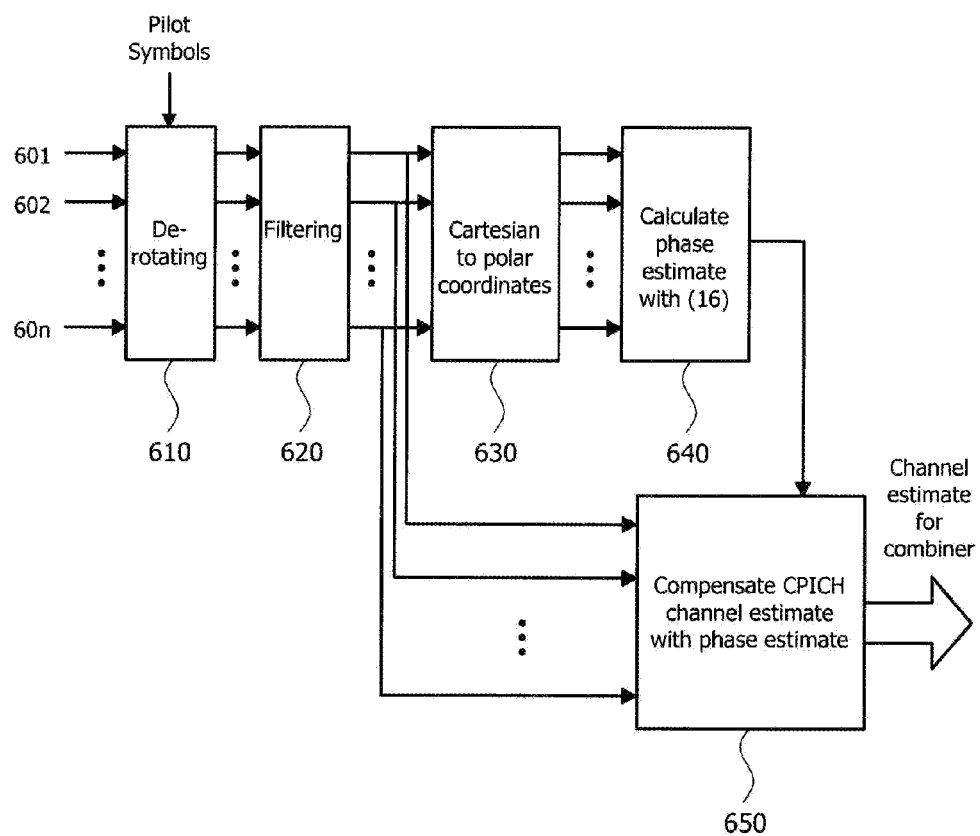
FIG. 6 is a block diagram of the functions of the processor unit of FIG. 5 according to an embodiment of the invention.

The scope of the invention is not limited to any particular digital communication system or standard. To better understand some of the advantages of the invention, an example of how the invention may be used in 3GPP WCDMA digital communication systems is described below with reference to FIGS. 5 and 6.

Since the CPICH and DPCH are transmitted through the same physical medium, they experience the same multipath and differ by the phase offset. Thus, with reference to FIG. 5, each of the fingers 1 to n (501, 502, . . . 50n) of a rake receiver receive the CPICH and DPCH with the same phase difference between them. The invention uses the information obtained from all fingers (501, 502, . . . 50$_n$) to estimate accurately the phase offset. This function is performed by a processing unit 510, which obtains the information from each of the fingers and instructs a combiner 520 how to best combine the signals received via the fingers. In this way, the phase offset estimation is improved as compared to estimating this information using only one finger.

In the rake receiver 500, both the CPICH and the DPCH are despread for each multipath component using the different fingers (501, 502, . . . 50n) of the rake. The despread information symbols from the DPCH are derotated using channel estimates 515 within the combiner 520 under the control of processing unit 510, which uses the corresponding known pilot symbols to obtain the channel estimates. Several despread, derotated symbols may be averaged in order to reduce the variance of these channel estimates.

The processing unit 510 may be implemented using a programmable digital signal processor (DSP) or any other processor, or an ASIC. The functions of the processing unit 510, working in conjunction with the combiner 520, are illustrated with reference to FIG. 6. The processing unit 510 first receives the despread pilot symbols for the dedicated channel and common channel for all fingers (601, 602, 60n). The pilot symbols are de-rotated 610, filtered 620, and converted to polar representation 630. The phase estimate is then calculated 640 using the algorithm in equation (16). The channel estimates to be used for combining are calculated 650, by compensating the CPICH channel estimates with the estimated phase.

The method of the invention combines information from more that one finger to establish a phase estimate, which are used to derive a second, more accurate, set of channel estimates, thereby improving system performance.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method of determining a phase offset between signaling channels in a communication system, comprising the steps of:

deriving a first set of channel estimates from symbols received through a first signaling channel;

deriving a second set of channel estimates from symbols received through a second signaling channel;
deriving first and second antenna phase estimates from the first and second sets of channel estimates, respectively; and
determining an estimate of the phase offset based on the set of first and second antenna phase estimates without using the first and second sets of channel estimates.

2. The method of claim 1, wherein the first and second signaling channels are pilot channels.

3. The method of claim 1, wherein the first and second signaling channels are a common pilot channel (CPICH) and a dedicated physical channel (DPCH), respectively.

4. A method of determining a set of complex channel estimates for a transmission channel in a communication system, comprising the steps of:
deriving a first set of channel estimates from symbols received through a first signaling channel;
deriving a second set of channel estimates from symbols received through a second signaling channel;
determining a phase offset value, $\phi$, between signaling channels in the communication system based on a set of first and second antenna phase estimates derived from the first and second sets of channel estimates, respectively; and
determining the set of complex channel estimates by compensating the first set of channel estimates based on the phase offset value.

5. The method of claim 4, wherein the phase offset value $\phi$ is determined by choosing $\phi$ among a set of predetermined feasible choices of $\phi$ that minimizes the following expression:

$$\varphi \in \left\{ \min_{\pi/4,\, 3\pi/4,\, 5\pi/4,\, 7\pi/4} \right\} \sum_{i=1}^{n} \frac{(\hat{\alpha}_i - \hat{\beta}_i + \varphi)^2}{\sigma_{ei}^2}$$

where:
$i \in [1, n]$ is a rake finger number of the receiver, and
$\hat{\alpha}_i$ and $\hat{\beta}_i$ are the respective antenna phase estimates derived for rake finger i from the first and second sets of channel estimates, and
$\sigma_{ei}^2$ is related to the power of interference.

6. The method of claim 5, wherein the complex channel estimate is determined by performing a linear combination of the first and second set of channel estimates.

7. The method of claim 4, wherein the first and second signaling channels are a common pilot channel (CPICH) and a dedicated physical channel (DPCH), respectively.

8. A channel estimator adapted to operate with a receiver in a communication system and to determine a set of complex channel estimates for a transmission channel of the communication system, the channel estimator comprising:
means that derive a first set of channel estimates from symbols received through a first signaling channel;
means that derive a second set of channel estimates from symbols received through a second signaling channel;
means that determine a phase offset value, $\phi$, between signaling channels in the communication system based on a set of first and second antenna phase estimates derived from the first and second sets of channel estimates, respectively; and
means that determine the set of complex channel estimates by compensating the first set of channel estimates based on the phase offset value.

9. The channel estimator of claim 8, wherein the means that determine a phase offset value comprise:
means that de-rotate the symbols received through the first and second signaling channels;
means that filter the de-rotated symbols;
means that convert the filtered de-rotated symbols to polar representations;
means that calculate the phase offset value according to the polar representations.

10. The channel estimator of claim 9, wherein the phase offset value $\phi$ is calculated by choosing $\phi$ among a set of predetermined feasible choices of $\phi$ that minimizes the following expression:

$$\varphi \in \left\{ \min_{\pi/4,\, 3\pi/4,\, 5\pi/4,\, 7\pi/4} \right\} \sum_{i=1}^{n} \frac{(\hat{\alpha}_i - \hat{\beta}_i + \varphi)^2}{\sigma_{ei}^2}$$

where:
$i \in [1, n]$ is a rake finger number of the receiver, and
$\hat{\alpha}_i$ and $\hat{\beta}_i$ are the respective first and second antenna phase estimates derived for rake finger i from the first and second sets of channel estimates, and
$\sigma_{ei}^2$ is related to the power of interference.

11. The channel estimator of claim 8, wherein the set of complex channel estimates is determined by performing a linear combination of the first and second set of channel estimates.

12. The channel estimator of claim 8, wherein the receiver is a RAKE receiver.

13. The channel estimator of claim 8, wherein the receiver operates in a cellular communication system.

14. The channel estimator of claim 8, wherein the first and second signaling channels are received by the receiver after transmission using transmit diversity.

15. The channel estimator of claim 8, wherein the first and second signaling channels are a common pilot channel (CPICH) and a dedicated physical channel (DPCH), respectively.

16. User equipment for a communication system, the user equipment adapted to determine a set of complex channel estimates for a transmission channel of the communication system, the user equipment comprising:
means that derive a first set of channel estimates from symbols received through a first signaling channel;
means that derive a second set of channel estimates from symbols received through a second signaling channel;
means that determine a phase offset value, $\phi$, between signaling channels in the communication system based on a set of first and second antenna phase estimates derived from the first and second sets of channel estimates, respectively; and
means that determine the set of complex channel estimates by compensating the first set of channel estimates based on the phase offset value.

17. The user equipment of claim 16, wherein the means that determine a phase offset value comprise:
means that de-rotate the symbols received through the first and second signaling channels;
means that filter the de-rotated symbols;
means that convert the filtered de-rotated symbols to polar representations;
means that calculate the phase offset value according to the polar representations.

18. The user equipment of claim 16, wherein the phase offset value φ is calculated by choosing φ among a set of predetermined feasible choices of φ that minimizes the following expression:

$$\varphi \in \left\{ \min_{\pi/4,\, 3\pi/4,\, 5\pi/4,\, 7\pi/4} \right\} \sum_{i=1}^{n} \frac{(\hat{\alpha}_i - \hat{\beta}_i + \varphi)^2}{\sigma_{ei}^2}$$

where:

i∈[1, n] is a rake finger number of the receiver, and $\hat{\alpha}_i$ and $\hat{\beta}_i$ are the respective first and second antenna phase estimates derived for rake finger i from the first and second sets of channel estimates, and $\sigma_{ei}^2$ is related to the power of interference.

19. The user equipment of claim 16, wherein the set of complex channel estimates is determined by performing a linear combination of the first and second set of channel estimates.

20. The user equipment of claim 16, wherein the first and second signaling channels are a common pilot channel (CPICH) and a dedicated physical channel (DPCH), respectively.

21. A method of determining a phase offset between signaling channels in a communication system, comprising the steps of:

deriving a first set of channel estimates from symbols received through a first signaling channel;

deriving a second set of channel estimates from symbols received through a second signaling channel; and determining an estimate of the phase offset based on a set of first and second antenna phase estimates derived from the first and second sets of channel estimates, respectively, wherein the estimate of the phase offset is determined by choosing a phase offset value, φ, among a set of predetermined feasible choices of φ that minimizes the following expression:

$$\varphi \in \left\{ \min_{\pi/4,\, 3\pi/4,\, 5\pi/4,\, 7\pi/4} \right\} \sum_{i=1}^{n} \frac{(\hat{\alpha}_i - \hat{\beta}_i + \varphi)^2}{\sigma_{ei}^2}$$

where:

i∈[1, n] is a rake finger number of the receiver, and $\hat{\alpha}_i$ and $\hat{\beta}_i$ are the respective first and second antenna phase estimates derived for rake finger i from the first and second sets of channel estimates, and $\sigma_{ei}^2$ is related to the power of interference.

* * * * *

UNITED STATES PATENT AND TRADEMARK OFFICE
CERTIFICATE OF CORRECTION

PATENT NO. : 7,149,258 B2  
APPLICATION NO. : 09/997344  
DATED : December 12, 2006  
INVENTOR(S) : Nilsson et al.

Page 1 of 1

It is certified that error appears in the above-identified patent and that said Letters Patent is hereby corrected as shown below:

In Column 3, Line 55, delete "$r_x(n)_1$" and insert -- $r_x(n)$, --, therefor.

In Column 12, Line 50, delete "that" and insert -- than --, therefor.

In Column 16, Line 22, in Claim 21, delete "$\bar{\alpha}hd\ i$" and insert -- $\hat{\alpha}_i$ --, therefor.

Signed and Sealed this

Twentieth Day of December, 2011

David J. Kappos
*Director of the United States Patent and Trademark Office*